(12) United States Patent
Jones

(10) Patent No.: US 7,436,861 B2
(45) Date of Patent: Oct. 14, 2008

(54) ASYNCHRONOUS CONTROL CIRCUIT WITH SYMMETRIC FORWARD AND REVERSE LATENCIES

(75) Inventor: Ian W. Jones, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1647 days.

(21) Appl. No.: 10/268,056

(22) Filed: Oct. 9, 2002

(65) Prior Publication Data

US 2004/0071151 A1 Apr. 15, 2004

(51) Int. Cl.
*H04J 15/00* (2006.01)
*H03K 19/00* (2006.01)
*H04L 5/00* (2006.01)

(52) U.S. Cl. .......................... 370/546; 326/93; 713/400

(58) Field of Classification Search .................. 326/93; 713/400
See application file for complete search history.

(56) References Cited

U.S. PATENT DOCUMENTS 5,386,585 A * 1/1995 Traylor .................. 712/29
6,356,117 B1 * 3/2002 Sutherland et al. ............ 326/93
6,700,410 B2 * 3/2004 Ebergen ...................... 326/93
6,958,627 B2 * 10/2005 Singh et al. ................... 326/93

OTHER PUBLICATIONS

Publication entitled "GasP: A Minimal FIFO Control," by Ivan Sutherland and Scott Fairbanks, 2001 IEEE, Proceedings of Seventh International Symposium on Advanced Research in Asynchronous Circuits and Systems, pp. 46-53.

* cited by examiner

*Primary Examiner*—Hassan Kizou
*Assistant Examiner*—Betty Lee
(74) *Attorney, Agent, or Firm*—Park, Vaughan & Fleming LLP; Edward J. Grundler

(57) ABSTRACT

One embodiment of the present invention provides a control queue for an asynchronous circuit that includes a number of control modules coupled together linearly to form the control queue. These control modules include a prior module, a present module, and a next module. The present module is configured to receive one or more forward-going inputs from the prior module and one or more reverse-going inputs from the next module. The present module asynchronously generates one or more forward-going outputs to the next module and one or more reverse-going outputs to the prior module. The modules within the control queue are constructed so that the latency of the forward-going signals through the control queue is equal to the latency of the reverse-going signals through the control queue.

24 Claims, 6 Drawing Sheets

ASYNCHRONOUS CONTROL CIRCUIT WITH SYMMETRIC FORWARD AND REVERSE LATENCIES

BACKGROUND

1. Field of the Invention

The present invention relates to the design of circuits that operate asynchronously. More specifically, the present invention relates to an asynchronous control circuit with symmetric forward and reverse latencies.

2. Related Art

As computer system clock speeds become progressively faster, it is becoming increasingly harder to synchronize the actions of computer system components with reference to a centralized system clock. To deal with this problem, computer system designers are beginning to investigate the use of asynchronous circuits that operate in a self-timed manner, without having to adhere to the constraints imposed by a centralized system clock.

Asynchronous circuits often make use of "control queues" to coordinate the movement of data between asynchronously controlled latches. Note that a control queue can be constructed using GasP modules, see "GasP: A minimal FIFO control," by Ivan Sutherland and Scott Fairbanks, *Proceedings of the International Symposium on Advanced Research in Asynchronous Circuits and Systems*, pages 46-53, IEEE Computer Society Press, March 2001. See also, U.S. Pat. No. 5,937,177 to Molnar and Fairbanks and U.S. Pat. No. 6,356,117 to Sutherland, et al. concerning asP* and GasP circuits, respectively.

For example, FIG. 1A illustrates a three-module control queue built with 4-2 GasP modules, which has an item latency in the forward direction of four delay units per module and a reverse latency of two units per module. This control queue forwards input control signals ui and li to produce output control signals uo and lo, where the items flow from left to right through the queue, and the acknowledge signals that introduce bubbles into the queue flow from right to left. At the input interface, ui and li are mutually exclusive, and either ui or li is acknowledged by an ai. The corresponding output interface acknowledge signal is ao. In this configuration, the item flow from left-to-right is subject to four delay units per module while the bubble flow from right-to-left is subject to two delay units per module.

Each of these control queue modules is known as a decision-wait module and can be constructed from a pair of GasP Join modules as is illustrated in FIG. 1B. The join module performs the "last of" function, where it generates one or more output signals (it fires) after the last of all of its input signals have been received. Upon firing, it also resets all its input signals. Input signals of the join are indicated by a small triangle, and when this triangle is filled in, it indicates that an initial condition where that input has already been received. In FIG. 1B, the common input c of decision-wait module 104 is coupled to the reverse-going inputs of both Join modules, so that when one fires, it reneges on the reverse-going input of the other Join module. The XOR function required to produce the common input interface acknowledge signal cc is achieved by wire-ORing a reverse-going output from each join module. Either join module firing will generate an acknowledge signal cc.

A decision-wait module is well known in the field of asynchronous design. FIG. 2 illustrates a 2×1 decision wait-module 202. As illustrated in FIG. 2, 2×1 decision-wait module 202 has two mutually exclusive inputs, a0 and a1, one common input, b, and two outputs, c0 and c1. Upon receipt of one of the mutually exclusive input signals a0 or a1 and the common input signal b, decision-wait module 202 generates a single output, either c0 or c1 dependent on which of the mutually inputs was received:

a0 and b generates c0,
a1 and b generates c1.

Decision wait modules can be cascaded to form control signal queues as shown in FIGS. 1 and 3.

FIG. 3A illustrates an alternative scheme for building a control queue using 2-4 GasP modules. In this scheme, the control signal travel is in the reverse direction through the queue from left to right. This results in an item latency of two delay units per module from left to right and a bubble latency of four delay units per module from right to left.

FIG. 3B illustrates how a decision-wait module 304 can similarly be constructed from a pair of GasP join modules. As illustrated in FIG. 3B, the common input c of decision-wait module 304 is coupled to the reverse-going inputs of both Join modules, so that when one fires, it reneges on the reverse-going input of the other Join module. The XOR function required to produce the common input interface acknowledge signal cc is achieved by wire-ORing a reverse-going output from each join module. Either join module firing will generate an acknowledge signal cc.

Control queues and FIFOs that have a longer forward latency and shorter reverse latency tend to be used in application where it is desirable to operate in a mode where the queue or FIFO is more than half full. They also offer better matching between control and data flow in FIFOs: a bundling constraint is that control must never progress ahead of its associated data. Control circuits that have less forward latency and longer reverse latency are often favored in applications where queues or FIFOs are operating closer to empty and thus each item input will propagate more quickly to the output. However, it is often difficult to match such control to the movement of data in a FIFO because the data movement tends to be the limiting delay in forward latency.

Each of the above described control queues can be useful for certain applications that have different latency requirements for item flow and bubble flow. However, in some applications it is desirable to provide equal latency for item flow and bubble flow. Hence, what is needed, is an apparatus and a method that facilitates controlling an asynchronous circuit using a control queue with equal item flow and bubble flow latencies.

SUMMARY

One embodiment of the present invention provides a control queue for an asynchronous circuit that includes a number of control modules coupled together linearly to form the control queue. These control modules include a prior module, a present module, and a next module. The present module is configured to receive one or more forward-going inputs from the prior module and one or more reverse-going inputs from the next module. The present module asynchronously generates one or more forward-going outputs to the next module and one or more reverse-going outputs to the prior module. The modules within the control queue are constructed so that the latency of the forward-going signals through the control queue is equal to the latency of the reverse-going signals through the control queue.

In a variation of this embodiment, the present module is configured to asynchronously perform a decision-wait function on the one or more forward-going inputs received from the prior module and the one or more reverse-going inputs received from the next module. This decision-wait function asynchronously generates the one or more forward-going outputs to the next module and the one or more reverse-going outputs to the prior module when sufficient of the inputs to the decision-wait function are asserted.

In a further variation, the control signals between modules alternate in polarity. For example, an assertion of a forward-going signal is encoded as a high voltage between the prior module and the present module, and is encoded as a low voltage between that present module and the next module.

In a further variation, successive modules in the control queue alternate between 2-4 GasP modules and 4-2 GasP modules.

In a further variation, the control queue is coupled to a number of successive stages of latches that operate under control of corresponding control modules in the control queue.

In a further variation, the latency of forward-going control signals and reverse going control signals through the control queue are each an odd number of gate delays.

In a further variation, the average latency of forward-going control signals and reverse going control signals through the control queue are each three gate delays.

In a further variation, the average latency of forward-going control signals and reverse going control signals through the control queue are each five gate delays.

Control circuits that have equal forward and reverse latencies offer advantages in systems where queues and FIFOs operate closer to half-full, such as are common in buffers between processing modules, and between memory systems and processing modules. In this scheme as in the prior art schemes, the sum of the forward and reverse latencies is the same. E.g., with the 4-2 GasP control circuit family, we can now offer forward latencies of two, three, or four units of delay per stage with corresponding four, three, or two units of reverse latency, respectively. In all three versions, the sum of the forward and reverse latencies is six units of delay.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

GasP Module with Three Units of Delay in Each Direction

Figure 1A:
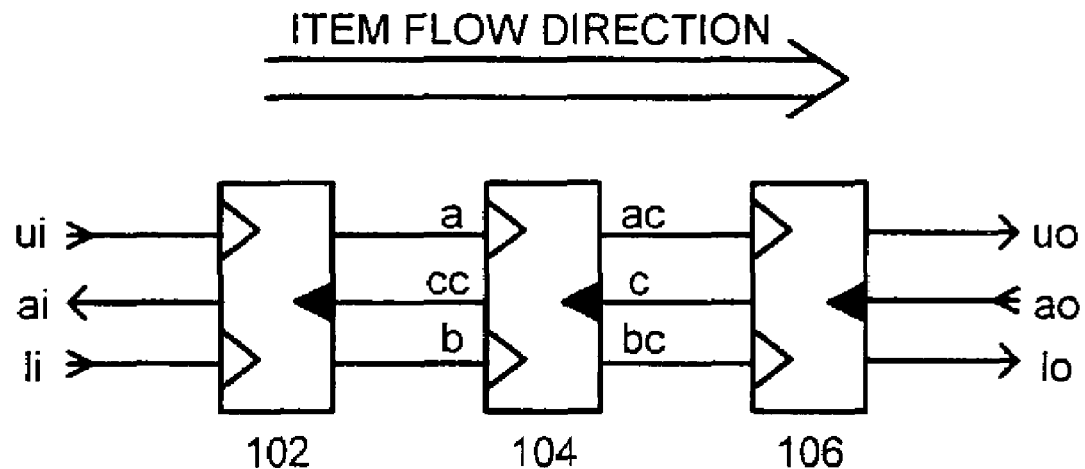
FIG. 1A illustrates a three-module asynchronous control queue.
Figure 1B:
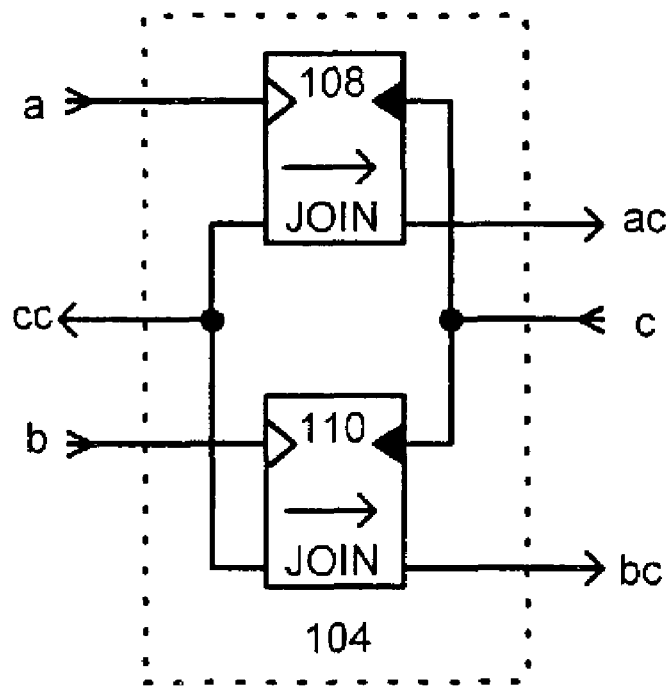
FIG. 1B illustrates a decision-wait module composed of 4-2 GasP Join modules.
Figure 2:
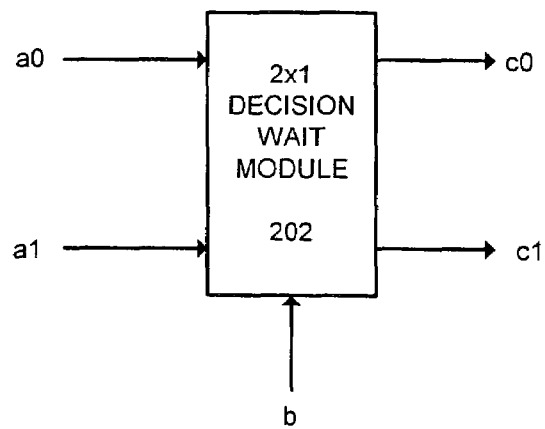
FIG. 2 illustrates a 2×1 decision wait-module.
Figure 3A:
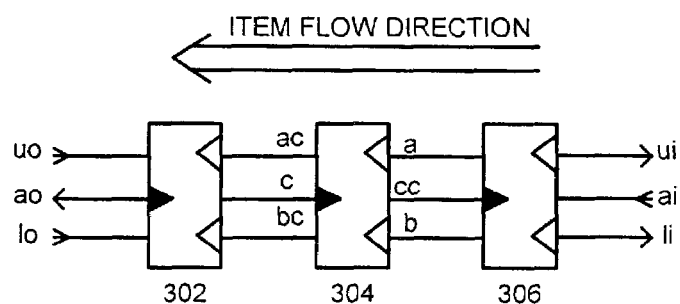
FIG. 3A illustrates an alternative scheme for building a control queue.
Figure 3B:
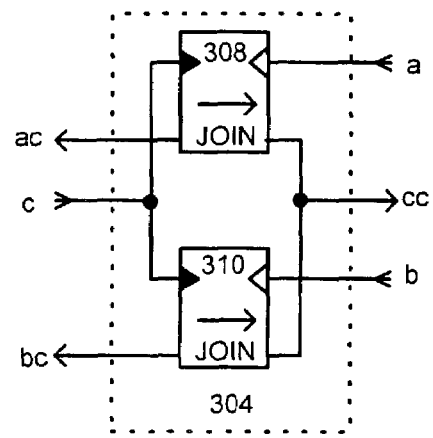
FIG. 3B illustrates a decision-wait module composed of 2-4 GasP join modules.
Figure 4A:
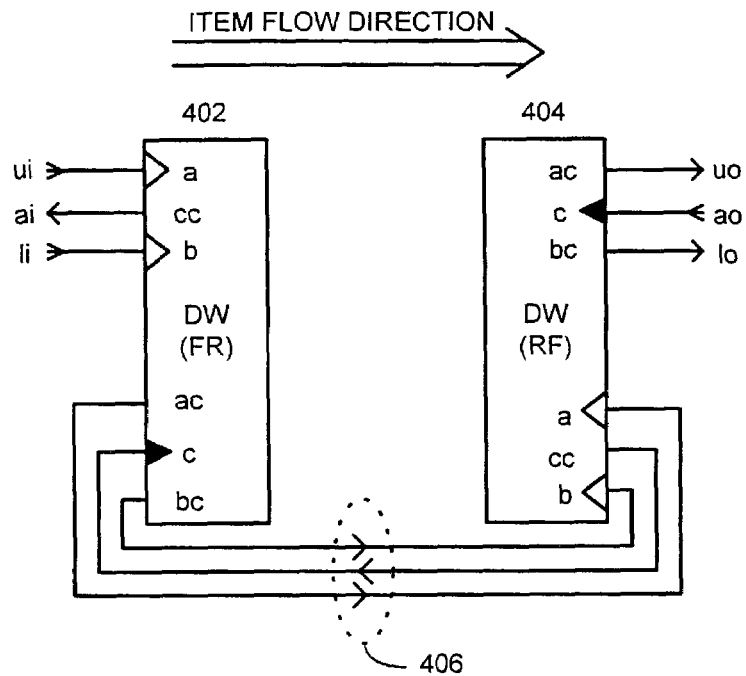
FIG. 4A illustrates a GasP module with three units of latency in both the forward and reverse directions in accordance with an embodiment of the present invention.

FIG. 4A illustrates a GasP module with three units of delay in each direction in accordance with an embodiment of the present invention. The modules of the queue as shown in FIG. 4A come in two alternate forms, FR and RF, which are described more fully below. A two-module queue comprised of decision-wait (DW) modules 402 and 404 is illustrated in FIG. 4A. Each DW module not only provides the decision-wait function of the module, but also converts the polarity of the control signals for the following module. The FR module 402 converts from a forward-going signal encoding into a reverse-going control signal encoding, while the RF module 404 converts from a reverse-going signal encoding into a forward-going control signal encoding. The conversion process involves inverting the polarity of the control signals so that a forward-going signal that is encoded as a high voltage between a first and second module is encoded as a low voltage between the second and third modules. Each of these converting modules has an item latency of three delay units and a bubble latency of three delay units when implemented with 4-2 GasP circuit modules. Note that the signals 406 use reverse-going signal encoding.

Figure 4B:
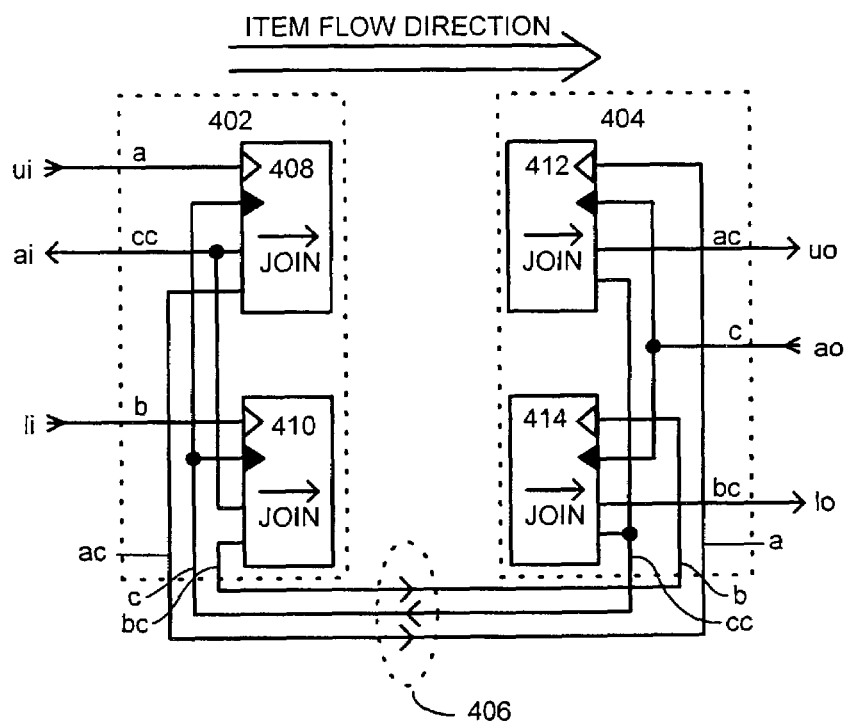
FIG. 4B illustrates implementation details of the GasP module illustrated in FIG. 4A in accordance with an embodiment of the present invention.

FIG. 4B illustrates implementation details of the GasP module of FIG. 4A in accordance with an embodiment of the present invention. Decision-wait module 402 includes join modules 408 and 410, while decision-wait module 404 includes join modules 412 and 414. These join modules are described in more detail below in conjunction with FIGS. 7 through 9B.

Figure 4C:
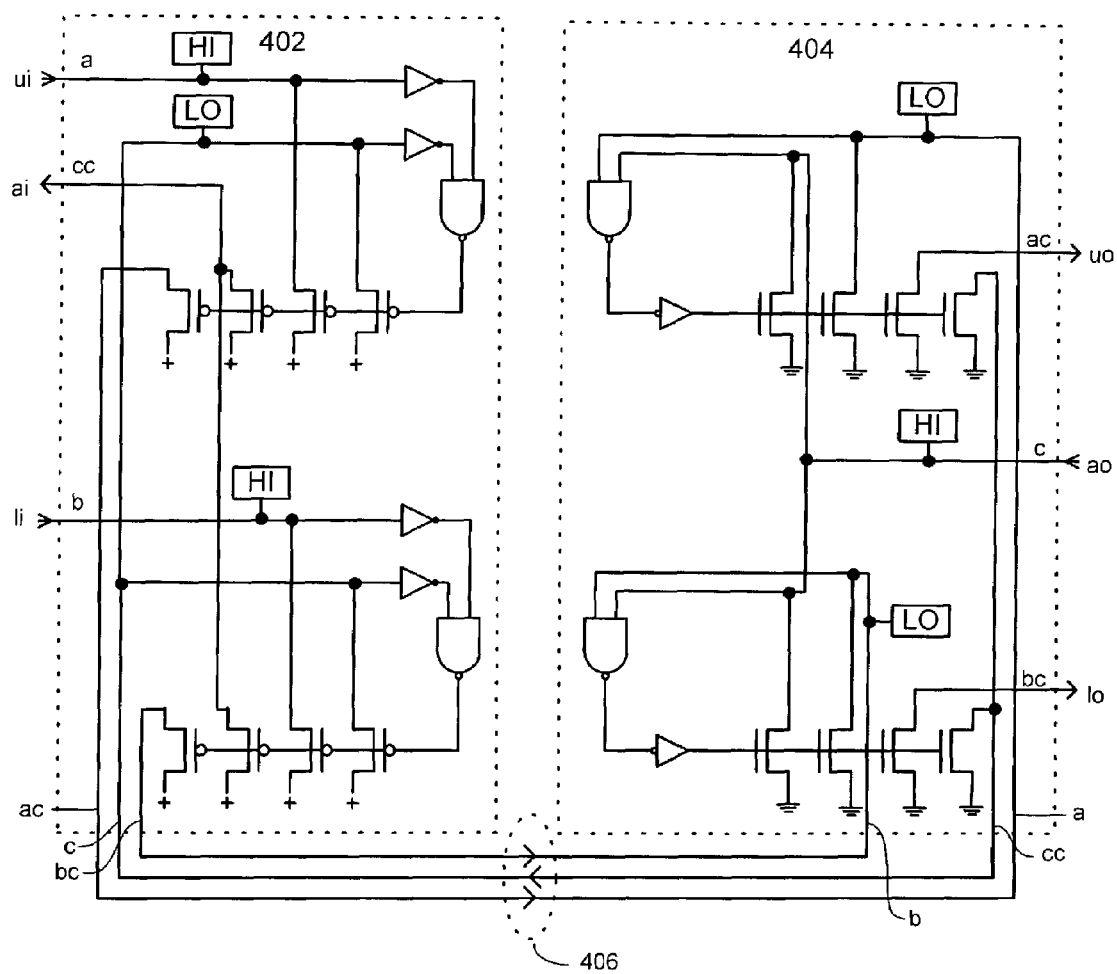
FIG. 4C illustrates a circuit-level implementation of the GasP module illustrated in FIG. 4A in accordance with an embodiment of the present invention.

FIG. 4C illustrates a circuit-level implementation of the GasP modules of FIG. 4A in accordance with an embodiment of the present invention. Note that FIG. 4C includes the keepers for the input signals. Thus the initial state of the keepers on inputs a, b, and c of the FR queue module 402 are HI, HI, and LO respectively, while for the RF queue module 404 they are LO, LO, and HI, respectively, because of the above-described inversion of the control signals.

FIFO With 3-3 Control Queue

Figure 5:
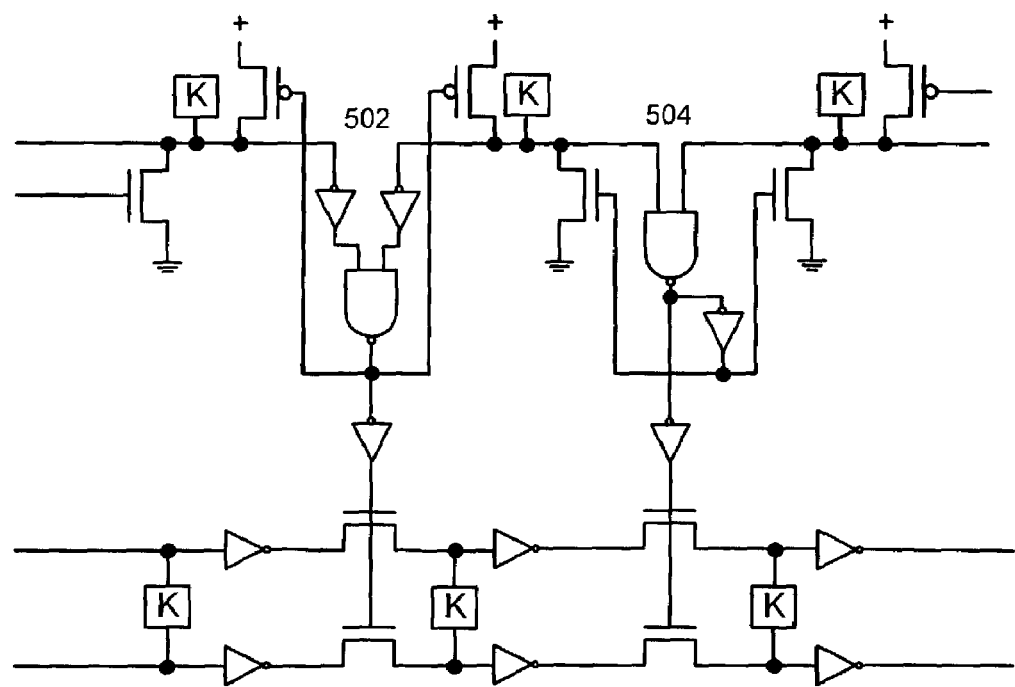
FIG. 5 illustrates a FIFO implementation including a control queue with three units of delay in each direction in accordance with an embodiment of the present invention.

FIG. 5 illustrates a first-in, first-out (FIFO) module implemented with a control queue with three units of delay in each direction in accordance with an embodiment of the present invention. The asynchronous FIFO control runs along the top of the figure and is a cascade of GasP join modules. The data path of the FIFO runs along the bottom of the figure, of which just a 1-bit data path is illustrated where the data is encoded in both true and compliment form. Outputs from successive GasP modules operate pass gates in the data path enabling the data to be moved forward from one stage to the next. Note that join module 502 is implemented with 4-2 GasP circuitry, while join module 504 is implemented with 2-4 GasP circuitry. The keepers, K, are initialized as required.

FIFO With 5-5 Control Queue

Figure 6:
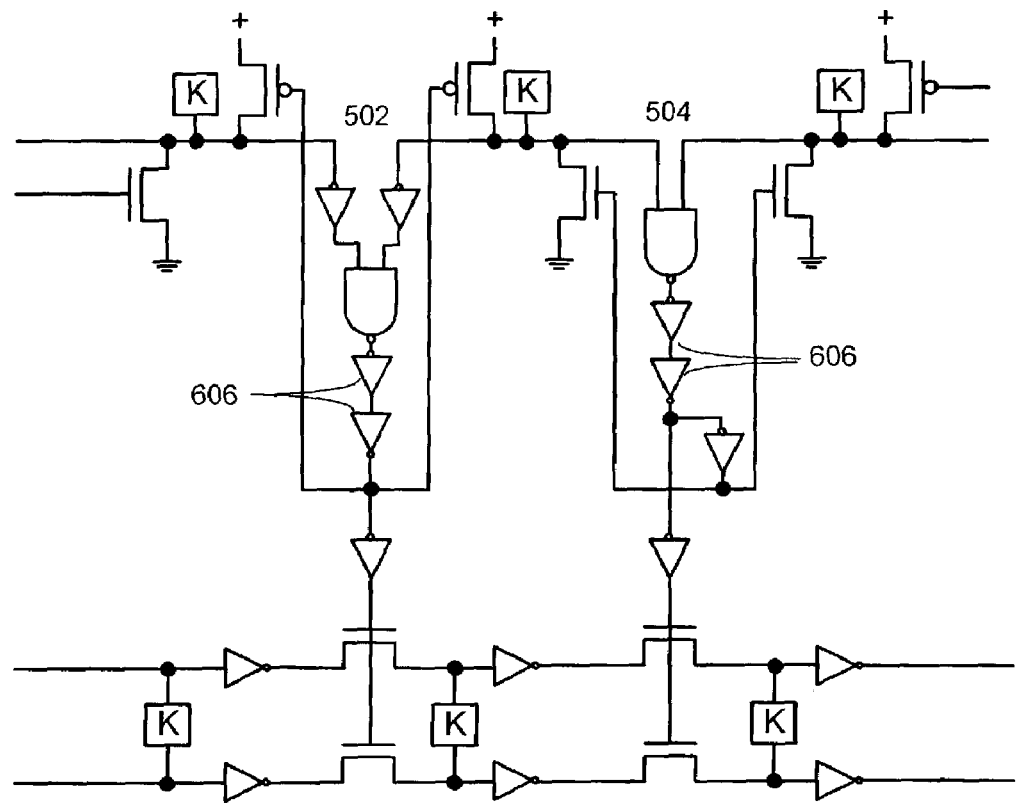
FIG. 6 illustrates a FIFO implemented with a control queue with five units of delay in each direction in accordance with an embodiment of the present invention.

FIG. 6 illustrates a FIFO implemented with a control queue with five units of delay in each direction in accordance with an embodiment of the present invention. The FIFO illustrated in FIG. 6 is identical to the FIFO illustrated in FIG. 5 except for the addition of two inverters 606 in each control path. These inverters add two units of delay to each path.

GasP Modules

Figure 7:
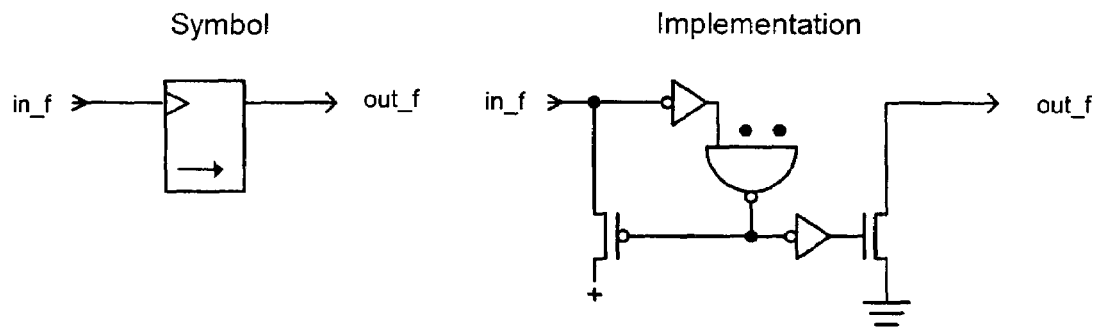
FIG. 7 illustrates the symbol and implementation for forward-going connections to a GasP module that has a latency of four gate delays from its input to its output in accordance with an embodiment of the present invention.
Figure 8:
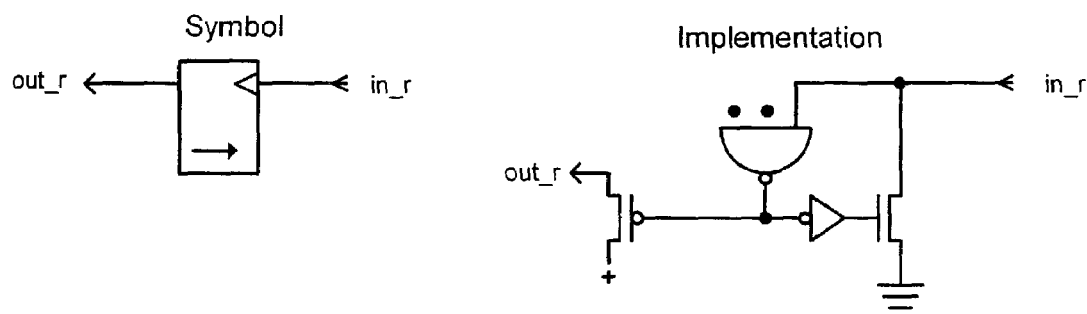
FIG. 8 illustrates the symbol and implementation for reverse-going connections to a GasP module that has a latency of two gate delays from its input to its output in accordance with an embodiment of the present invention.

We denote a GasP module by means of a rectangular box with an arrow inside that indicates the forward direction and a series of connections. The input and output signal connections denote the events that are associated with the GasP module. FIGS. 7 and 8 illustrate the forward and reverse connections of a GasP module together with their 4-2 GasP implementations. FIG. 7 shows the symbol and implementation for forward connections to a GasP module that has a latency of four gate delays from its input, in_f, to its output, out_f. FIG. 8 shows the symbol and implementation for reverse connections to a GasP module that has a latency of two gate delays from its input, in_r, to its output, out_r.

Figure 9A:
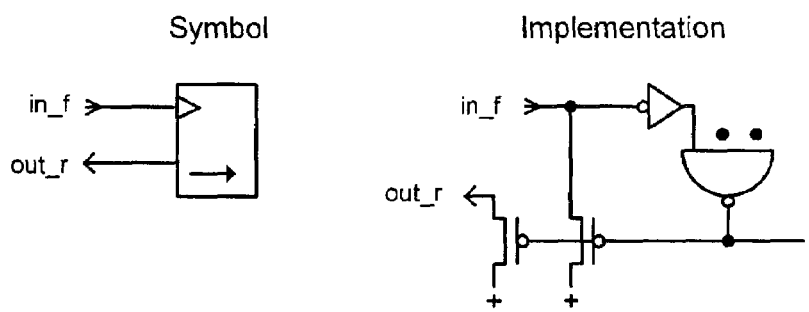
FIG. 9A illustrates the symbol and circuit implementation for forward-going input and reverse-going output connections that have a latency of three gate delays from its input to its output in accordance with an embodiment of the present invention.
Figure 9B:
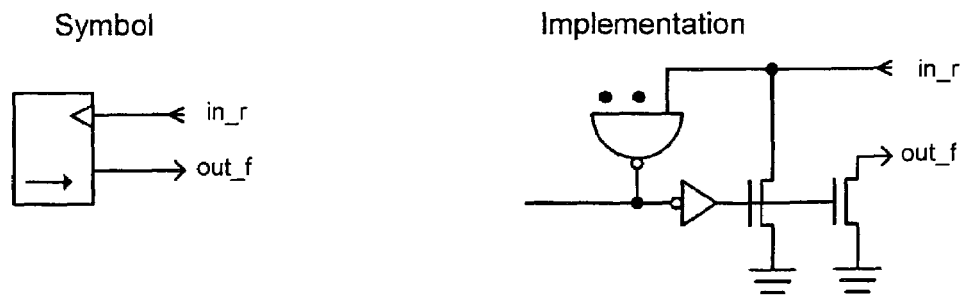
FIG. 9B illustrates the symbol and circuit implementation for reverse-going input and forward-going output connections that have a latency of three gate delays from its input to its output in accordance with an embodiment of the present invention.

FIGS. 9A and 9B illustrate GasP module connections that have equal input to output latencies of three units. FIG. 9A shows the symbol and circuit implementation that has a latency of three gate delays from its input, in_f, to its output, out_r. Notice that in_f is asserted LO, while out_r is HI when asserted. FIG. 9B shows the symbol and circuit implementation that has a latency of three gate delays from its input, in_r, to its output, out_f Notice that in_r is asserted HI, while out_f is LO when asserted.

In FIGS. 7, 8, and 9, the GasP modules are shown with so-called self-resetting inputs. Common in all GasP module implementations is a NAND gate. To complete the GasP Module implementation, circuitry is added to the NAND gate for each connection. When all inputs of a GasP module are asserted, the NAND gate will eventually "fire," i.e., go LO. After the NAND gate fires, all self-resetting inputs are reset, and all outputs are generated.

Each control signal connection between GasP modules is implemented as a tri-state wire with a keeper, also known as a "state conductor." A tri-state wire is a wire that is either "driven HI", "driven LO", or "not driven." To avoid clutter, connections in schematics appear as lines between GasP modules, and keepers are frequently not shown. When a connection is driven HI or LO, the connection will be driven for a short period only, a period that is long enough to set the keeper and wire HI or LO. The keeper will then keep the state of the connection when the wire is not driven. Using the GasP implementations of FIGS. 7, 8, and 9, the period that a wire is driven is about three gate delays. Notice that each pull-down or pull-up transistor conducts for a period of about three gate delays.

In order for these implementations to work correctly, all transistors must be properly sized. Here, this means that all gates must have the same step-up ratio, i.e., the ratio between each gate's drive strength and output load is the same. When properly sized, each gate has about the same delay, and thus we can justifiably speak about units of delay between any two events.

In an implementation we indicate the initial state of each connection by either filling in or not filling in the input triangles of the modules. A connection with a filled in triangle is initially asserted, that is, the connection is initialized LO when it is a forward-going input, and initialized HI when it is a reverse-going input.

The above descriptions are for the 4-2 GasP family of modules that have a forward latency of four units and a reverse latency of two units. The same circuit techniques and principles can be applied to GasP circuit families such as 6-4 GasP and 8-6 GasP.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A control queue for an asynchronous circuit, comprising:
   a number of control modules coupled together linearly to form the control queue, including a prior module, a present module and a next module;
   wherein the present module is configured to receive one or more forward-going inputs from the prior module and one or more reverse-going inputs from the next module;
   wherein the present module is configured to asynchronously generate one or more forward-going outputs to the next module and one or more reverse-going outputs to the prior module; and
   wherein the latency of forward-going signals through the control queue is equal to the latency of reverse-going signals through the control queue.

2. The control queue of claim 1, wherein the present module is configured to asynchronously perform a decision-wait function on the one or more forward-going inputs received from the prior module and the one or more reserve-going inputs received from the next module;
   wherein the decision-wait function asynchronously generates the one or more forward-going outputs to the next module and the one or more reverse-going outputs to the prior module when sufficient of the inputs to the decision-wait function are asserted.

3. The control queue of claim 1, wherein the present module is configured to asynchronously perform a join function on the one or more forward-going inputs received from the prior module and the one or more reverse-going inputs received from the next module;
   wherein the join function asynchronously generates the one or more forward-going outputs to the next module and the one or more reverse-going outputs to the prior module when sufficient of the inputs to the join function are asserted.

4. The control queue of claim 1, wherein the control signals between modules alternate in polarity, so that an assertion of a forward-going signal is encoded as a high voltage between the prior module and the present module, and is encoded as a low voltage between that present module and the next module.

5. The control queue of claim 1, wherein successive modules in the control queue alternate between 2-4 GasP modules and 4-2 GasP modules.

6. The control queue of claim 1, further comprising a number of successive stages of latches that operate under control of corresponding control modules in the control queue.

7. The control queue of claim 1, wherein the latency of forward-going control signals and reverse going control signals through the control queue are each an odd number of gate delays.

8. The control queue of claim 1, wherein the average latency of forward-going control signals and reverse going control signals through the control queue are each three gate delays.

9. A method for operating a control queue for an asynchronous circuit, wherein a number of control modules are coupled together linearly to form the control queue, wherein the control queue includes a prior module, a present module and a next module, the method comprising:
  receiving one or more forward-going inputs from the prior module and one or more reverse-going inputs from the next module at the present module; and
  generating one or more forward-going outputs to the next module and one or more reverse-going outputs to the prior module from the present module;
  wherein the average latency of forward-going signals through the control queue is equal to the latency of reverse-going signals through the control queue.

10. The method of claim 9, wherein generating the one or more forward-going outputs to the next module and the one or more reverse-going outputs to the prior module involves:
  asynchronously performing a decision-wait function on the one or more forward-going inputs received from the prior module and the one or more reserve-going inputs received from the next module; and
  asynchronously generating the one or more forward-going outputs to the next module and the one or more reverse-going outputs to the prior module when sufficient of the inputs to the decision-wait function are asserted.

11. The method of claim 9, wherein generating the one or more forward-going outputs to the next module and the one or more reverse-going outputs to the prior module involves:
  asynchronously performing a join function on the one or more forward-going inputs received from the prior module and the one or more reverse-going inputs received from the next module; and
  asynchronously generating the one or more forward-going outputs to the next module and the one or more reverse-going outputs to the prior module when sufficient of the inputs to the join function are asserted.

12. The method of claim 9, wherein the control signals between modules in polarity, so that an assertion of a forward-going signal is encoded as a high voltage between the prior module and the present module, and is encoded as a low voltage between that present module and the next module.

13. The method of claim 9, wherein successive modules in the control queue alternate between 2-4 GasP modules and 4-2 GasP modules.

14. The method of claim 9, wherein a number of successive stages of latches operate under control of corresponding control modules in the control queue.

15. The method of claim 9, wherein the latency of forward-going control signals and reverse going control signals through the control queue are each an odd number of gate delays.

16. The method of claim 9, wherein the average latency of forward-going control signals and reverse going control signals through the control queue are each three gate delays.

17. A computer system containing asynchronous circuitry, comprising:
  a processor;
  a memory;
  asynchronous circuitry; and
  a control queue within the asynchronous circuitry; wherein the control queue includes a number of control modules coupled together linearly to form the control queue, including a prior module, a present module and a next module;
  wherein the present module is configured to receive one or more forward-going inputs from the prior module and one or more reverse-going inputs from the next module;
  wherein the present module is configured to asynchronously generate one or more forward-going outputs to the next module and one or more reverse-going outputs to the prior module; and
  wherein the latency of forward-going signals through the control queue is equal to the latency of reverse-going signals through the control queue.

18. The computer system of claim 17, wherein the present module is configured to asynchronously perform a decision-wait function on the one or more forward-going inputs received from the prior module and the one or more reverse-going inputs received from the next module;
  wherein the decision-wait function asynchronously generates the one or more forward-going outputs to the next module and the one or more reverse-going outputs to the prior module when sufficient of the inputs to the decision-wait function are asserted.

19. The computer system of claim 17, wherein the present module is configured to asynchronously perform a join function on the one or more forward-going inputs received from the prior module and the one or more reverse-going inputs received from the next module;
  wherein the join function asynchronously generates the one or more forward-going outputs to the next module and the one or more reverse-going outputs to the prior module when sufficient of the inputs to the join function are asserted.

20. The computer system of claim 17, wherein the control signals between modules alternate in polarity, so that an assertion of a forward-going signal is encoded as a high voltage between the prior module and the present module, and is encoded as a low voltage between that present module and the next module.

21. The computer system of claim 17, wherein successive modules in the control queue alternate between 2-4 GasP modules and 4-2 GasP modules.

22. The computer system of claim 17, further comprising a number of successive stages of latches that operate under control of corresponding control modules in the control queue.

23. The computer system of claim 17, wherein the latency of forward-going control signals and reverse going control signals through the control queue are each an odd number of gate delays.

24. The computer system of claim 17, wherein the average latency of forward-going control signals and reverse going control signals through the control queue are each three gate delays.

* * * * *